United States Patent Office 3,586,692
Patented June 22, 1971

3,586,692
5-FORMAMIDO-4-THIOCARBAMOYL-IMIDAZOLE
Morio Ikehara, Osaka, and Izumi Kumashiro and Akihior Yamazaki, Kanagawa-ken, Japan; said Kumashiro and Yamazaki assignors to Ajinomoto Co., Inc., Tokyo, Japan
No Drawing. Filed Oct. 30, 1968, Ser. No. 772,051
Claims priority, application Japan, Nov. 11, 1967, 42/72,246
Int. Cl. C07d 49/36
U.S. Cl. 260—309                                    1 Claim

ABSTRACT OF THE DISCLOSURE 5-amino-4-thiocarbamoylimidiazole reacts with formic acid to form 5-formamido - 4 - thiocarbamoylimidiazole which is an effective antimetabolite against NF-sarcoma in mice.

This invention relates to a new compound, 5-formamido-4-thiocarbamoylimidazole (hereinafter referred to as F-TAICA) and its preparation.

It has been found that F-TAICA is obtained by reacting 5 - amino-4-thiocarbamoylimidazole (hereinafter referred to as TAICA) with formic acid and that F-TAICA has anti-tumor effects and only low toxicity.

The starting compound, 4 - thiocarbamoylimidazole (TAICA), has been described by Hitching et al. (U.S. Pat. No. 2,756,228), but the reported compound is not TAICA, but 5 - amino-4-(s-dithiophosphoryl)thiocarbamoylimidazole which is converted to TAICA by heating in an aqueous solution of an inorganic acid.

In the process of this invention, it is desirable to use formic acid in excess over the TAICA employed, because formic acid acts as a reactant and a solvent at the same time. A mixture of a salt of formic acid, such as an alkali metal salt, an alkaline earth metal salt and ammonium salt, and of an acid stronger than formic acid, such as hydrochloric acid, sulfuric acid, nitric acid and phosphoric acid, can be used instead of formic acid. When an inorganic acid salt of TAICA is employed as a starting material, a salt of formic acid is used. It is also desirable to add formic acid to reaction systems otherwise composed of TAICA and a salt of formic acid or of a salt of TAICA and a salt of formic acid.

As a solvent, an alkanol, such as ethanol, can be used, but it does not provide particularly good result.

The formylation reaction is carried out at elevated temperature, preferably at the boiling point of the mixture. The usual reaction time is 0.5–5 hours.

F-TAICA is easily separated from the reaction mixture, for instance, by distilling off the solvent and recrystallizing the residue from a suitable solvent, such as water and a lower alkanol.

LD and ED values of F-TAICA to NF-sarcoma are shown as follows:

| Sample | Mg./kg./day (×5 days) | | | | |
|---|---|---|---|---|---|
| | $LD_{50}$ | $LD_{10}$ | $ED_{50}$ | $ED_{90}$ | $ED_{90}/ED_{50}$ |
| F-TAICA | 180 | 110 | 4.8 | 35 | 7.3 |
| 5-FU[1] | 45 | 32 | 27 | (50) | (1.9) |

[1] 5-fluorouracil was used as a control sample.

20 milligrams of NF-sarcoma were inoculated subcutaneously to the back of ddN-strain mice weighing 17–21 g. (female), 18–23 g. (male). Experimental and control groups were 6 animals, respectively. Various doses of the sample dissolved or suspended in physiological saline were injected intraperitoneally once a day for consecutive 5 days, starting at 24 hours from the inoculation. The animals were killed on 10th day after the inoculation and each weight of the sarcoma was measured and each result was compared with that of control.

Effective value of administration (30 mg./kg. a day) of F-TAICA was 15% as the sarcoma weight ratio of experimental to control.

EXAMPLE 1

(a) Preparation of TAICA

Into one litre of pyridine solution containing 50 g. of 5 - aminoimidazole-4-carboxamide, 80 g. of phosphorus pentasulfide were added little by little while refluxing the solution. After refluxing for two hours, the mixture was cooled, and the crystals formed were separated by filtration. The crystals were then added to 300 ml. of 3 normal hydrochloric acid and the mixture was refluxed for one hour. The mixture was treated with active carbon and filtered. The filtrate was concentrated to crystallize 15 g. of TAICA hydrochloride.

The physical properties and analytical data of TAICA hydrochloric are as follows:

(1) Melting point: above 260° C.
(2) Ultraviolet absorption maxima: (m$\mu$)

$$\lambda_{max.}^{pH\ 1}\ 282,\ 330$$

$$\lambda_{max.}^{pH\ 6}\ 273,\ 333$$

$$\lambda_{max.}^{pH\ 13}\ 372.5,\ 347$$

(3) $R_f$ value:
   Solvent A [1]; 0.63
   Solvent B [2]; 0.56

[1] Solvent A; n-butanol : acetic acid : water (4 : 1 : 1 v./v.).
   [2] Solvent B; n-propanol : ammonia water (28%) : water (20 : 12 : 3 v./v.).

(4) Dissociation constant: pKa 2.6 (in 50 vol. percent aqueous ethanol at 25° C.)
(5) Characteristic infrared-absorption:

$$\lambda_{max.}^{KBr}\ 1150\ cm.^{-1}:\ -C(=S)NH_2$$

(6) Stability: When exposed to ultraviolet radiation for a long time, the initially colorless crystals become slightly colored.
(7) Elementary analysis: Calcd. for $C_4H_7N_4SCl$ (percent)—C, 26.89; H, 3.95; N, 31.36. Found (percent)—C, 27.01; H, 4.12; N, 31.54.

(b) Preparation of F-TAICA

A mixture of 5 g. TAICA and 70 ml. formic acid was refluxed for 2 hours. Then, the solvent (excess formic acid) was distilled off under reduced pressure and the residue was recrystallized from aqueous ethanol (1:1) to produce 4.55 g. of F-TAICA. Yield 76%. The physical properties and analytical data of F-TAICA are as follows:

(1) Melting point: above 260° C.
(2) Ultraviolet absorption maxima: (m$\mu$)

$$\lambda_{max.}^{pH\ 1}\ 278,\ 321$$

$$\lambda_{max.}^{pH\ 6}\ 278,\ 329$$

(3) $R_f$ value: Solvent B; 0.50
(4) Stability: F-TAICA is very easily converted to 6-mercaptopurine by contact with an alkaline medium, such as aqueous sodium hydroxide.
(5) Elementary analysis: Calcd. for $C_5H_6ON_4S$ (percent)—C, 35.30; H, 3.55; N, 32.93. Found (percent)—C, 35.57; H, 4.10; N, 33.51.

EXAMPLE 2

A mixture of 1.78 g. of TAICA hydrochloride, 0.68 g. of sodium formate and 50 ml. of formic acid was refluxed for 2 hours. The solvent was distilled off under reduced pressure and the residue was recrystallized from aqueous ethanol (1:1) to obtain 1.2 g. of F-TAICA. Yield 70.2%. The physical properties of the crystals obtained were identical with those obtained in Example 1.

What we claim is:
1. 5-formamido-4-thiocarbamoylimidazole.

References Cited

Ichikawa et al.: J. Het. Chem. 2 (3), 253–5 (1965).
Morrison et al.: "Organic Chemistry, 2nd edition," Allyn and Bacon, Inc., Boston, Mass. (1966), p. 603.

HENRY R. JILES, Primary Examiner

G. T. TODD, Assistant Examiner

U.S. Cl. X.R.
424—273